(12) United States Patent
Noma et al.

(10) Patent No.: US 9,678,386 B2
(45) Date of Patent: Jun. 13, 2017

(54) LIQUID-CRYSTAL DISPLAY DEVICE AND PROCESS FOR PRODUCING LIQUID-CRYSTAL DISPLAY DEVICE

(71) Applicant: Merck Patent GmbH, Darmstadt (DE)

(72) Inventors: Takeshi Noma, Osaka (JP); Youhei Nakanishi, Osaka (JP); Masanobu Mizusaki, Osaka (JP)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 14/436,580

(22) PCT Filed: Oct. 17, 2013

(86) PCT No.: PCT/JP2013/078236
§ 371 (c)(1),
(2) Date: Apr. 17, 2015

(87) PCT Pub. No.: WO2014/061755
PCT Pub. Date: Apr. 24, 2014

(65) Prior Publication Data
US 2016/0170269 A1  Jun. 16, 2016

(30) Foreign Application Priority Data
Oct. 19, 2012 (JP) ................................ 2012-232326

(51) Int. Cl.
*C09K 19/12* (2006.01)
*G02F 1/1337* (2006.01)
(Continued)

(52) U.S. Cl.
CPC ...... *G02F 1/133711* (2013.01); *G02F 1/1341* (2013.01); *G02F 1/133788* (2013.01);
(Continued)

(58) Field of Classification Search
CPC ........ C09K 2019/0448; C09K 2219/03; C09K 2019/122; G02F 1/133711; G02F 1/133788; G02F 2202/023; G02F 1/1341
See application file for complete search history.

(56) References Cited

U.S. PATENT DOCUMENTS

2005/0264737 A1\* 12/2005 Kataoka ................. C09K 19/56
349/124
2009/0141215 A1  6/2009 Bremer et al.
(Continued)

FOREIGN PATENT DOCUMENTS

CN       101445455 A     6/2009
CN       101566761 A    10/2009
(Continued)

OTHER PUBLICATIONS

Noma et al., "Liquid-Crystal Display Device and Process for Producing Liquid-Crystal Display Device", U.S. Appl. No. 15/408,580, filed Jan. 18, 2017.
(Continued)

*Primary Examiner* — Shean C Wu
(74) *Attorney, Agent, or Firm* — Keating & Bennett, LLP

(57) ABSTRACT

The present invention provides a liquid-crystal display device capable of maintaining a high voltage holding ratio even without an alignment film. The liquid-crystal display device of the present invention includes a pair of substrates, a liquid crystal layer which is sandwiched between the substrates and which contains a liquid crystal material, and a polymer layer which is disposed on a surface of each of the substrates and which controls the alignment of liquid crystal molecules. The outermost surfaces of both the substrates comprise substantially no alignment film. The polymer layer is formed by polymerizing one or more radical polymerizable monomer species added to the liquid crystal layer. At least one species of the one or more radical polymerizable monomer species is a biphenyl compound having a specific structure.

23 Claims, 6 Drawing Sheets

Low linearity

High linearity

(51) Int. Cl.
*G02F 1/1341* (2006.01)
*C09K 3/10* (2006.01)
*C09K 19/04* (2006.01)

(52) U.S. Cl.
CPC ........ *C09K 3/10* (2013.01); *C09K 2019/0448* (2013.01); *C09K 2019/122* (2013.01); *G02F 2202/023* (2013.01)

(56) References Cited

U.S. PATENT DOCUMENTS

| | | | |
|---|---|---|---|
| 2009/0269515 A1 | 10/2009 | Kataoka | |
| 2011/0272631 A1* | 11/2011 | Saito | C09K 19/12 252/299.61 |
| 2015/0247090 A1* | 9/2015 | Mizusaki | C07J 17/00 349/123 |

FOREIGN PATENT DOCUMENTS

| | | |
|---|---|---|
| CN | 102292412 A | 12/2011 |
| JP | 2005-338613 A | 12/2005 |
| JP | 2010-033093 A | 2/2010 |

OTHER PUBLICATIONS

Official Communication issued in corresponding Chinese Patent Application No. 201380054585.9, mailed on Dec. 2, 2016.

* cited by examiner

| | Sample A |
|---|---|
| Concentration of formula (3) | 2.0wt% |
| Before irradiation |  |
| After irradiation |  |

Fig. 7

| | Sample B | Sample C | Sample D |
|---|---|---|---|
| Concentration of formula (3) | 1.6wt% | 1.3wt% | 1.0wt% |
| Concentration of formula (4) | 0.3wt% | 0.5wt% | 0.7wt% |
| Formula (4)/Formula (3) | 20.5mol% | 34.6mol% | 49.1mol% |
| Before irradiation | | | |
| After irradiation | | | |

Low linearity

High linearity

LIQUID-CRYSTAL DISPLAY DEVICE AND PROCESS FOR PRODUCING LIQUID-CRYSTAL DISPLAY DEVICE

TECHNICAL FIELD

The present invention relates to a liquid-crystal display device and a process for producing the liquid-crystal display device. The present invention specifically relates to a liquid-crystal display device which is free from any known alignment film and which controls the alignment of liquid crystal molecules using a polymer layer (hereinafter, also referred to as a polymer sustained alignment (PSA) layer) that is formed by polymerizing a monomer contained in the liquid crystal composition, and a process for producing a liquid-crystal display device which is suitable for producing the polymer layer.

BACKGROUND ART

Since liquid-crystal display devices have a thin profile, a light weight, and low power consumption, they are widely used as display apparatuses such as televisions, personal computers, and PDAs. Recently, large-size liquid-crystal display devices have rapidly been introduced in various fields, such as liquid-crystal display devices for televisions. Such large-size devices suitably employ a multi-domain vertical alignment (MVA) mode because the MVA-mode display devices can be produced at a high yield despite their large areas and can have a wide viewing angle. With the multi-domain vertical alignment mode, the liquid crystal molecules are aligned orthogonally to the substrate surface when no voltage is applied to the inside of the liquid crystal layer. Thus, this mode can provide a higher contrast ratio than the conventional twisted nematic (TN) mode.

In the MVA mode, the tilting direction of the liquid crystal molecules is controlled not by an alignment film but by the protrusions (ribs) formed of an insulating material. The alignment film thus requires no alignment treatment, eliminating static electricity and dust due to an alignment treatment such as rubbing. This removes a requirement for washing or the like treatment after the alignment treatment. Further, the liquid crystal molecules suffer less initial tilting variations. Therefore, this mode is effective to simplify the process, to increase the yield, and to reduce the cost.

Although the MVA mode requires no alignment treatment, it still requires formation of a base film which corresponds to an alignment film. In order to prevent the influences on the alignment of liquid crystal molecules due to an uneven film thickness of this base film or due to contamination by foreign material, and in order to prevent an increase in the number of steps or in the investment in plant and equipment for the formation of a base film, it is more preferable not to form the base film itself.

In recent years, one technique has been focused on in which a liquid crystal composition containing a liquid crystal material in admixture with any polymerizable components such as monomers and oligomers (hereinafter, abbreviated as monomers) is injected into between the substrates, and then heat or light (e.g., ultraviolet radiation) is applied to the composition to polymerize the monomers, thereby forming a polymer layer (PSA layer) (for example, see Patent Literature 1). Such a polymer layer makes it possible to maintain the alignment of liquid crystal molecules even without an alignment film.

CITATION LIST

Patent Literature

Patent Literature 1: JP 2010-33093 A

SUMMARY OF INVENTION

Technical Problem

However, the experiments performed by the present inventors have revealed that some material or production conditions cause a failure in providing good display even when a liquid crystal composition that contains a liquid crystal material, a monomer, a polymerization initiator, and the like is injected into between substrates and then a polymer layer is formed by a polymerization reaction under predetermined conditions.

One monomer for forming the polymer layer is a monomer having an alkyl group, and examples thereof include lauryl acrylate represented by the following formula (9).

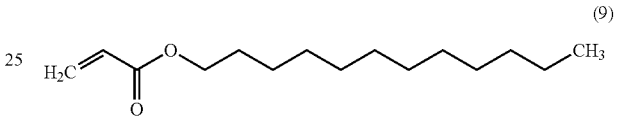

(9)

The present inventors have examined and thereby found that the above lauryl acrylate weakly interacts with liquid crystal molecules, likely causing alignment defects and reduction in voltage holding ratio (VHR).

Patent Literature 1 proposes to use a symmetric polyfunctional monomer in addition to lauryl acrylate, thereby providing, even without an alignment film, an initial voltage holding ratio and a residual DC value at the same levels as those with an alignment film. Examples of the symmetric polyfunctional monomer include a symmetric polyfunctional monomer represented by the following formula (10):

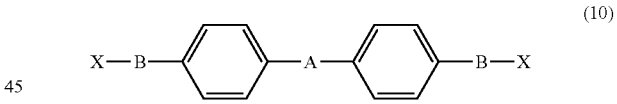

(10)

wherein
X represents acrylate or methacrylate;
A is a structure represented by the following formula (11), (12), or (13);
B is a structure represented by the following formula (14) or (15); and
m and n each are an integer of 0 or 1 or greater.

(11)

(12)

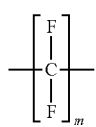

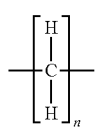

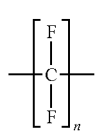

The examinations performed by the present inventors reveal the following. Specifically, the symmetric polyfunctional monomer represented by the formula (10) has no alkyl chain that contributes to vertical alignment. Thus, the symmetric polyfunctional monomer alone cannot form a polymer layer that aligns the liquid crystal molecules orthogonally to the substrate surface.

The present inventors have further examined the types of a monomer that can provide good display without an alignment film. Then, they have found that a compound represented by the following formula (16) can more strongly interact with liquid crystal molecules than the lauryl acrylate because it has a biphenyl structure, so that the resulting polymer layer alone can provide stable alignment even without an alignment film.

In contrast, the present inventors have also found that, although the use of the compound represented by the formula (16) can provide stable alignment with a polymer layer alone, this compound reduces the VHR.

The present invention is devised in consideration of the above situation, and it aims to provide a liquid-crystal display device which can maintain a high voltage holding ratio even without an alignment film.

Solution to Problem

The present inventors have examined various possible causes of VHR reduction, and focused on the fact that the compound of the formula (16) generates radicals by UV irradiation and then polymerize, thereby forming a polymer layer. They have further found the following. Specifically, since the compound of the formula (16) has only one polymerizable group, the compound may fail to contribute to the polymerization if this polymerizable group is ionized before formation of a polymer layer. This ionized group floats as impurity ions in the liquid crystal layer, causing VHR reduction.

The present inventors have further examined a monomer that can stabilize the alignment of liquid crystal molecules and can maintain a high voltage holding ratio. Thereby, the inventors have developed a novel monomer represented by the following formula (1) that has a biphenyl structure, which strongly interacts with liquid crystal molecules, an alkyl chain, and two polymerizable groups.

As a result, the present inventors have arrived at the solution of the above problems and completed the present invention.

One aspect of the present invention is a liquid-crystal display device comprising
a pair of substrates;
a liquid crystal layer which is sandwiched between the substrates and which contains a liquid crystal material; and
a polymer layer which is disposed on a surface of each of the substrates and which controls the alignment of liquid crystal molecules,
the outermost surfaces of both the substrates comprising substantially no alignment film,
the polymer layer being formed by polymerizing one or more radical polymerizable monomer species added to the liquid crystal layer, and
at least one species of the one or more radical polymerizable monomer species being a compound represented by the following formula (1):

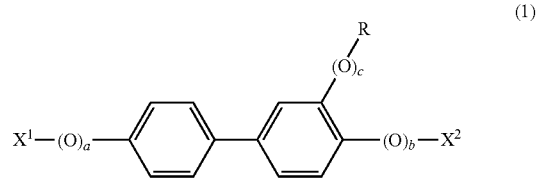

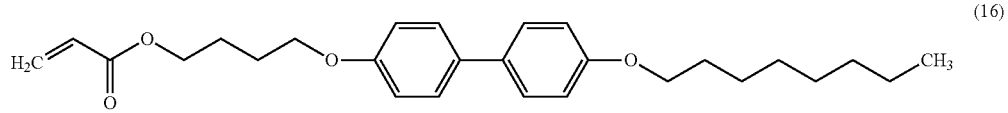

wherein
$X^1$ and $X^2$ may be the same as or different from each other, and represent acryloyl, methacryloyl, vinyl, or allyl;
a is 0 or 1;
b is 0 or 1;
c is 0 or 1;
R is a C1-C20 alkyl; and
each hydrogen atom may optionally be replaced by halogen, methyl, ethyl, or propyl.

R in the compound of the formula (1) is preferably a C4-C20 alkyl, more preferably a C8-C20 alkyl, and still more preferably a C16-C20 alkyl.

One of the substrates in the liquid-crystal display device of the present invention may be an array substrate and the other may be a color filter substrate. The array substrate comprises multiple pixel electrodes. This makes it possible to control the alignment of liquid crystal per pixel. The color filter substrate comprises color filters of multiple colors disposed at the sites where the color filters overlap the corresponding pixel electrodes on the array substrate. This makes it possible to control the displayed color per pixel.

The outermost surfaces of both the substrates comprise substantially no alignment film. The term "alignment film" herein means a monolayer film or a multilayer film of polyimide, polyamic acid, polyamide, polymaleimide, polysiloxane, polysilsesquioxane, polyphosphazene, or a copolymer thereof, or a film which is formed by oblique deposition of silicon oxide. The alignment film can control the alignment of liquid crystal molecules. In usual liquid-crystal display devices, an alignment film can be formed by directly applying (e.g., application of polyimide) or depositing (e.g., oblique deposition of silicon oxide (SiO)) an alignment film material onto the substrate surface constituting the display area. The display area herein means an area showing an image to be recognized by a viewer and does not include the surrounding area such as terminal portions. The alignment film is not limited to an alignment-treated film as long as a known alignment film material (e.g., polyimide) is applied onto the film.

Each of the substrates is provided with, on a surface thereof, a polymer layer that controls the alignment of liquid crystal molecules. The polymer layer is formed by polymerizing one or more radical polymerizable monomer species added to the liquid crystal layer. The formation of the polymer layer makes it possible to give initial tilting in a certain direction to the liquid crystal molecules near the polymer layer even without an alignment film. For example, when a polymer layer is formed by polymerizing a monomer while the liquid crystal molecules are aligned with pre-tilt alignment, the resulting polymer layer can have a structure that aligns the liquid crystal molecules with such pre-tilt alignment.

Since the monomer represented by the formula (1) has a biphenyl basic structure, it can be polymerized by light from a light source such as black light even without a polymerization initiator. Further, since this monomer has an alkyl chain, the monomer alone can form a polymer layer that stably aligns the liquid crystal molecules. Additionally, the monomer has two polymerizable groups. Thus, even if one polymerizable group is ionized before the formation of a polymer layer, the other polymerizable group can contribute to the polymerization. As a result, the monomer does not remain in the liquid crystal layer, so that the polymer can maintain a high VHR even after UV irradiation.

The liquid-crystal display device of the present invention is not especially limited by other components as long as it essentially includes the above components.

The proportion of the compound of the formula (1) is preferably not lower than 0.5% by weight and not higher than 2.5% by weight in the whole liquid crystal composition constituting the liquid crystal layer before the polymerization.

At least another one species of the one or more radical polymerizable monomer species preferably has a cyclic structure and a monofunctional polymerizable group.

The radical polymerizable monomer having a cyclic structure and a monofunctional polymerizable group is preferably a compound represented by the following formula (2):

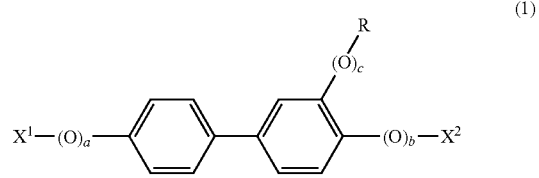

wherein
X represents acrylate, methacrylate, acryloyloxy, methacryloyloxy, vinyl, or allyl;

m is an integer of 0 to 12;
a is 0 or 1;
b is 0 or 1;
R is a C1-C20 alkyl; and
each hydrogen atom may optionally be replaced by halogen, methyl, ethyl, or propyl.

The biphenyl basic structure and the alkyl chain in the compound of the formula (2) are collinear with each other, so that the compound has high linearity. Combination use of the monomer of the formula (1) and the monomer of the formula (2) can further improve the vertical alignment performance of the polymer layer.

R in the compound of the formula (2) is preferably a C4-C12 alkyl, and more preferably a C8-C12 alkyl. Further, m is preferably an integer of 2 or greater, more preferably 4 or greater, and still more preferably 8 or greater.

The ratio of the radical polymerizable monomer having a cyclic structure and a monofunctional polymerizable group is preferably 10 mol % or more to the compound of the formula (1) before the polymerization.

The liquid crystal material preferably has negative dielectric constant anisotropy. This enables production of a vertical alignment-mode liquid-crystal display device having a high contrast ratio by forming a polymer layer so as to vertically align the liquid crystal molecules near the polymer layer.

Another aspect of the present invention is a process for producing a liquid-crystal display device, comprising the steps of:

injecting a liquid crystal composition that contains a liquid crystal material and one or more radical polymerizable monomer species into between a pair of substrates the outermost surfaces of which comprise substantially no alignment film; and applying light to the liquid crystal composition to polymerize the radical polymerizable monomers to thereby form a polymer layer which controls the alignment of liquid crystal molecules on a surface of each of the substrates, at least one species of the one or more radical polymerizable monomer species being a compound represented by the following formula (1):

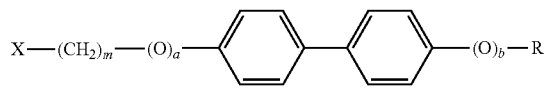

wherein
$X^1$ and $X^2$ may be the same as or different from each other, and represent acryloyl, methacryloyl, vinyl, or allyl;
a is 0 or 1;
b is 0 or 1;
c is 0 or 1;
R is a C1-C20 alkyl; and
each hydrogen atom may optionally be replaced by halogen, methyl, ethyl, or propyl.

R in the compound of the formula (1) is preferably a C4-C20 alkyl, more preferably a C8-C20 alkyl, and still more preferably a C16-C20 alkyl.

The process for producing a liquid-crystal display device of the present invention comprises the step of injecting a liquid crystal composition that contains a liquid crystal material and one or more radical polymerizable monomer species into between a pair of substrates the outermost surfaces of which comprise substantially no alignment film. The liquid crystal material and the radical polymerizable monomers here can be the same as those described for the liquid-crystal display device of the present invention.

The process for producing a liquid-crystal display device of the present invention comprises the step of applying light to the liquid crystal composition to polymerize the radical polymerizable monomers to thereby form a polymer layer which controls the alignment of liquid crystal molecules on a surface of each of the substrates. The production process of the present invention enables control of the alignment of liquid crystal molecules without a known alignment film, and suppresses reduction in the voltage holding ratio. Thus, it can exclude additional steps or investment in equipment required for forming an alignment film.

Examples of the step of forming a polymer layer include a step performed while a voltage not lower than the threshold value is applied to the liquid crystal layer. When the PSA polymerization is performed by applying light while applying a voltage not lower than the threshold value to the liquid crystal layer, a polymer can be formed along the liquid crystal molecules in the state of being aligned by the applied voltage not lower than the threshold value. Thus, the resulting polymer layer has a structure that aligns the liquid crystal molecules with a pre-tilt angle even after the voltage is removed therefrom.

Examples of the step of forming a polymer layer include a step performed while a voltage of not lower than the threshold value is not applied to the liquid crystal layer. Even without a voltage of not lower than the threshold value, a polymer layer that controls the alignment of liquid crystal molecules can be formed. Thus, the operations for applying a voltage can be excluded.

The process for producing a liquid-crystal display device of the present invention is not especially limited by other steps as long as it essentially includes the above steps.

Examples of preferable modes of the process for producing a liquid-crystal display device of the present invention include the following modes (a) to (j), which are the same as the preferable modes of the liquid-crystal display device of the present invention. Specifically, the modes are the following:

(a) the mode in which the proportion of the compound of the formula (1) is not lower than 0.5% by weight and not higher than 2.5% by weight in the whole liquid crystal composition;

(b) the mode in which at least another one species of the one or more radical polymerizable monomer species has a cyclic structure and a monofunctional polymerizable group;

(c) the mode in which the radical polymerizable monomer having a cyclic structure and a monofunctional polymerizable group is a compound of the formula (2);

(d) the mode in which R in the compound of the formula (2) is a C4-C12 alkyl;

(e) the mode in which R in the compound of the formula (2) is a C8-C12 alkyl;

(f) the mode in which m in the compound of the formula (2) is an integer of 2 or greater;

(g) the mode in which m in the compound of the formula (2) is an integer of 4 or greater;

(h) the mode in which m in the compound of the formula (2) is an integer of 8 or greater;

(i) the mode in which the ratio of the radical polymerizable monomer having a cyclic structure and a monofunctional polymerizable group is 10 mol % or more to the compound of the formula (1); and (j) the mode in which the liquid crystal material has negative dielectric constant anisotropy.

The process for producing a liquid-crystal display device preferably further comprises a heating step at a temperature not lower than the temperature 30° C. lower than the phase transition temperature of the liquid crystal material. This step is more preferably performed simultaneously with the light application step. The heating at a temperature not lower than the temperature 30° C. lower than the phase transition temperature of the liquid crystal material makes it easy to align the liquid crystal molecules orthogonally to the substrate surfaces.

The process for producing a liquid-crystal display device preferably further comprises an annealing step (a heat-treating step) before the light application step. The annealing allows the radical polymerizable monomers to diffuse inside the liquid crystal layer, making the monomer concentration in the liquid crystal layer uniform. As a result, the polymer layer can uniformly be formed on both of the substrates.

Advantageous Effects of Invention

The present invention can provide a liquid-crystal display device capable of maintaining a high voltage holding ratio even without an alignment film.

BRIEF DESCRIPTION OF THE DRAWINGS

FIG. 7 shows photographs of liquid crystal cells of Example 2 before and after the UV irradiation.

DESCRIPTION OF EMBODIMENTS

Figure 1:
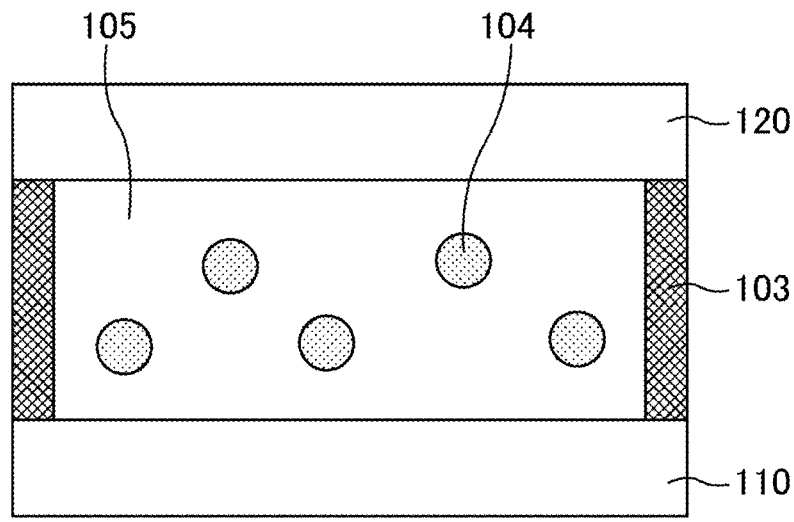
FIG. 1 is a schematic cross-sectional view showing a liquid-crystal display device of Embodiment 1 before the PSA polymerization.

The present invention will be described in more detail below referring to the drawings in the following embodiments, but is not limited to these embodiments.

Embodiment 1

The liquid-crystal display device of the present invention and a liquid-crystal display device produced by the production process of the present invention can exert excellent display characteristics when, for example, they are used as display apparatuses such as televisions, personal computers, mobile phones, and digital signage.

Figure 2:
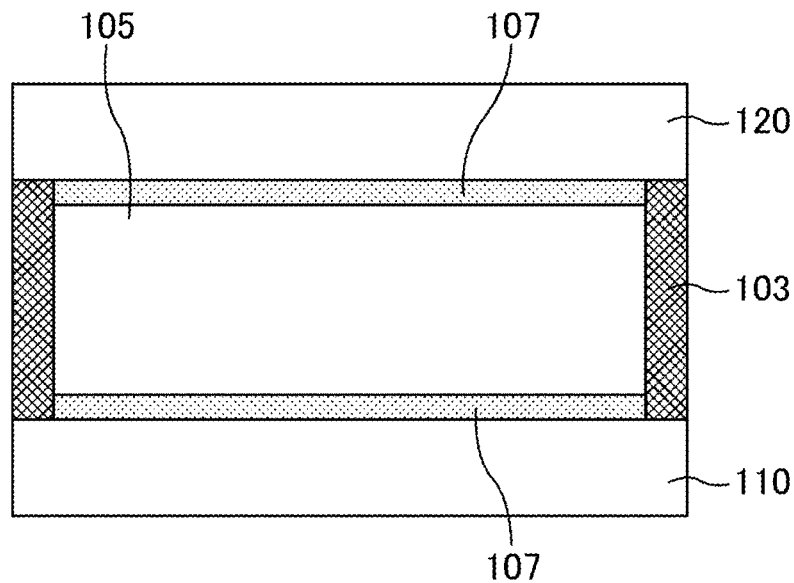
FIG. 2 is a schematic cross-sectional view showing the liquid-crystal display device of Embodiment 1 after the PSA polymerization.

FIG. 1 and FIG. 2 each show a schematic cross-sectional view of the liquid-crystal display device of Embodiment 1.

FIG. 1 is before the PSA polymerization and FIG. 2 is after the PSA polymerization. As shown in FIG. 1 and FIG. 2, the liquid-crystal display device of Embodiment 1 comprises a pair of substrates consisting of an array substrate 110 and a color filter substrate 120, and a liquid crystal layer 105 sandwiched between the array substrate 110 and the color filter substrate 120. The array substrate 110 comprises an insulating transparent substrate made of glass or other material, and conductive lines, pixel electrodes, thin film transistors (TFTs), and the like disposed on the transparent substrate. The color filter substrate 120 comprises an insulating transparent substrate made of glass or other material, and a color filter, a black matrix, a common electrode, and the like disposed on the transparent substrate.

As shown in FIG. 1, the liquid crystal layer 105 contains a liquid crystal material and one or more radical polymerizable monomer species 104 before the PSA polymerization. The liquid crystal material preferably has negative dielectric constant anisotropy. The radical polymerizable monomers 104 comprise a compound represented by the following formula (1):

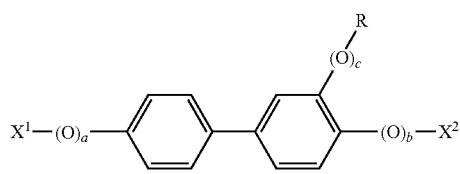

(1)

wherein
$X^1$ and $X^2$ may be the same as or different from each other and represent acryloyl, methacryloyl, vinyl, or allyl;
a is 0 or 1;
b is 0 or 1;
c is 0 or 1;
R is a C1-C20 alkyl; and
each hydrogen atom may optionally be replaced by halogen, methyl, ethyl, or propyl.

R in the compound of the formula (1) is preferably a C4-C20 alkyl, more preferably a C8-C20 alkyl, and still more preferably a C16-C20 alkyl.

The proportion of the radical polymerizable monomers 104 in the whole liquid crystal composition constituting the liquid crystal layer before the polymerization is preferably not lower than 0.5% by weight and not higher than 2.5% by weight, and more preferably higher than 1.5% by weight and not higher than 2.0% by weight.

Preferably, annealing (heat treatment) is performed after the liquid crystal composition containing a liquid crystal material and one or more radical polymerizable monomer species 104 is injected into between the array substrate 110 and the color filter substrate 120. The annealing allows the radical polymerizable monomers 104 to diffuse inside the liquid crystal layer 105, making the monomer concentration uniform in the liquid crystal layer 105. This enables uniform formation of the polymer layer 107 to be mentioned later on each of the substrates 110 and 120.

Thereafter, the liquid crystal layer 105 is irradiated with light while heated, so that the radical polymerizable monomers 104 generate radicals. These radicals serve as active species, and thus the radical polymerizable groups of the radical polymerizable monomers 104 start and successively promote the chain polymerization. As shown in FIG. 2, the polymer formed by the polymerization precipitates on the substrates 110 and 120 to form the polymer layers (PSA layers) 107. The heating temperature is preferably a temperature not lower than the temperature 30° C. lower than the phase transition temperature of the liquid crystal material. Heating at such a temperature makes it easy to align the liquid crystal molecules orthogonally to the substrate surfaces.

Since the radical polymerizable monomers 104 used in Embodiment 1 each have a biphenyl basic structure, they can generate radicals in response to the light applied from a light source such as a black light to cause polymerization even without a polymerization initiator. A different light source may be used for the polymerization. Still, light having a short wavelength (e.g., wavelength component having a wavelength of shorter than 330 nm) may deteriorate the panel interior structures, resulting in deterioration in the quality of displays in some cases. Thus, in terms of reliability, a black light (wavelength range: 300 to 370 nm) is preferably used.

If a polymerization initiator such as Irgacure 651 is used, matters cleaved by UV irradiation serve as impurities floating in the liquid crystal, reducing the VHR. Since no polymerization initiator is used in Embodiment 1, the VHR can be kept high in comparison with the case of using a polymerization initiator. Further, since the radical polymerizable monomers 104 have polymerizable groups, they are incorporated into the polymer layers 107 during the polymerization. Thus, the amount of the monomers remaining in the liquid crystal layer 105 can greatly be reduced.

As shown in FIG. 2, the polymer layer (PSA layer) 107 is formed on a surface of each of the array substrate 110 and the color filter substrate 120, each of which has no alignment film, in Embodiment 1. A sealing material 103 is directly attached to the substrates 110 and 120 between the array substrate 110 and the color filter substrate 120 along the peripheries of the substrates 110 and 120. This sealing material 103 seals the liquid crystal layer 105 in between the array substrate 110 and the color filter substrate 120. The application of light to the liquid crystal layer 105 is performed after the liquid crystal layer 105 is sealed by the sealing material 103. Thus, the polymer layers 107 are formed within the area surrounded by the sealing material 103.

In Embodiment 1, for example, light is applied to the liquid crystal layer 105 while a voltage not lower than the threshold value is applied thereto in the PSA polymerization. This enables formation of a polymer that is along the alignment of liquid crystal molecules which are aligned in response to the applied voltage not lower than the threshold value. Thus, the resulting polymer layers give a pre-tilt angle to the liquid crystal molecules even after the voltage is removed. It should be noted that, even when a voltage not lower than the threshold value is not applied to the liquid crystal layer 105 in the PSA polymerization, polymer layers that induce vertical alignment can be formed when the radical polymerizable monomers in Embodiment 1 are used.

The following will describe the other constituent elements of the liquid-crystal display device of Embodiment 1.

In the liquid-crystal display device of Embodiment 1, the array substrate 110, the liquid crystal layer 105, and the color filter substrate 120 are stacked in the order set forth from the back side to the viewing side of the liquid-crystal display device. The back side of the array substrate 110 is provided with a polarizing plate. The viewing side of the color filter substrate 120 is also provided with a polarizing plate. These polarizing plates each may further be provided with a retarder. The polarizing plates may be circularly polarizing plates.

The liquid-crystal display device of Embodiment 1 can be of any types of transmission, reflective, and transflective. In the case of a transmission or transflective type, the liquid-crystal display device of Embodiment 1 further comprises a backlight. The backlight is disposed on the back side of the array substrate 110 such that the light passes through the array substrate 110, the liquid crystal layer 105, and the color filter substrate 120 in the order set forth. In the case of a reflective or transflective type, the array substrate 110 is provided with a reflector for reflecting the light from outside. The polarizing plate of the color filter substrate 120 needs to be a circularly polarizing plate provided with what is called a λ/4 retarder at least at a region utilizing the reflected light for display.

The liquid crystal layer 105 is filled with a liquid crystal material having a characteristic of aligning in a specific direction when a certain voltage is applied. The alignment of the liquid crystal molecules in the liquid crystal layer 105 is controlled by application of a voltage not lower than the threshold value.

Figure 3:
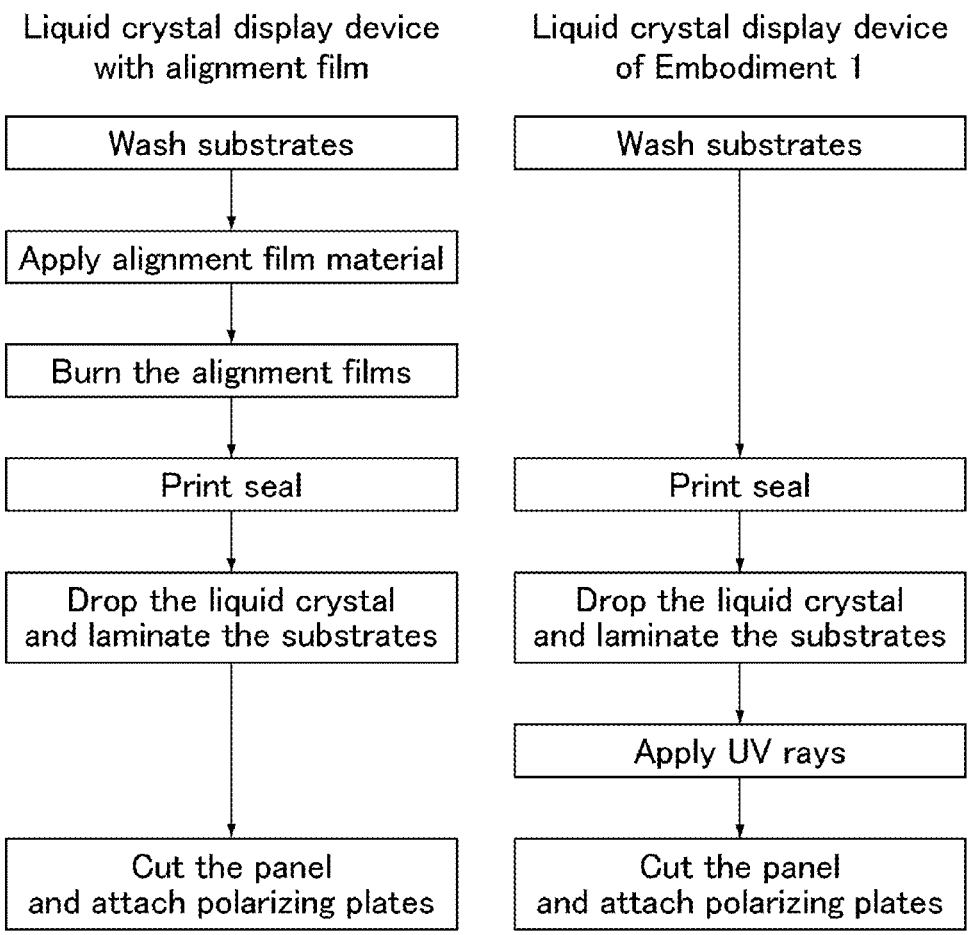
FIG. 3 is a flow chart for comparing a process for producing a liquid-crystal display device with an alignment film and a process for producing the liquid-crystal display device of Embodiment 1.

The following will describe a process for producing the liquid-crystal display device of Embodiment 1 referring to FIG. 3 for comparing a process for producing a liquid-crystal display device with an alignment film and a process for producing the liquid-crystal display device of Embodiment 1.

First described is a process for producing a liquid-crystal display device with an alignment film. As shown in FIG. 3, an array substrate and a color filter substrate are washed, and then an alignment film material is applied to each substrate and subjected to high-temperature burning (at about 200° C.) After the alignment films are burnt, the alignment films may be rubbed and washed in some cases.

After the alignment films are formed, multiple pillar-shaped photo spacers made of an insulating material are formed, or spacers made of an insulating material are scattered, on one of the substrates. Then, the substrates are laminated with each other using a sealing material. In the case of the one drop fill method, a liquid crystal material is dropped before the substrates are laminated. In the case of the vacuum filling method, a liquid crystal material is injected in vacuo after the substrates are laminated. The sealing material may be any of those curable by heat, those curable by UV irradiation, and those curable by both of heat and UV irradiation.

The pair of substrates laminated by the above step is cut into a desired size. To the surface of each substrate on the side opposite to the liquid crystal layer are attached a polarizing plate, a phase difference film, and the like. Further, a gate driver, a source driver, a display control circuit, and the like are mounted thereon, and a backlight and other components are incorporated thereinto. Thereby, a liquid-crystal display device in accordance with the use is completed.

In contrast, a process for producing the liquid-crystal display device of the present invention comprises neither a step of applying an alignment film material after washing the array substrate and the color filter substrate nor a step of burning the resulting film. Alternatively, the process comprises a step of forming a polymer layer for controlling the alignment of liquid crystal molecules. Specifically, a liquid crystal composition containing a liquid crystal material and radical polymerizable monomers is injected into between the substrates by the one drop fill method or the vacuum filling method. After the injection, the liquid crystal composition is preferably annealed (heat-treated). Thereafter, ultraviolet rays are applied to the substrates sandwiching the liquid crystal composition, thereby forming a polymer layer for controlling the alignment of liquid crystal molecules. The application of ultraviolet rays is preferably performed during heating at a temperature not lower than the temperature 30° C. lower than the phase transition temperature of the liquid crystal material.

Then, similar to the process for producing a liquid-crystal display device with an alignment film, the laminated substrates are cut into a desired size and a polarizing plate, a phase difference film, and the like components are attached to the surface of each substrate on the side opposite to the liquid crystal layer. Further, a gate driver, a source driver, a display control circuit, and the like are mounted thereon and a backlight and other components are incorporated thereinto. Thereby, a liquid-crystal display device in accordance with the use is completed.

With respect to the liquid-crystal display device of Embodiment 1, the composition of the monomers in the polymer layers, the compositional ratio of the monomers in the polymer layers, the residual amounts of the monomers in the liquid crystal layer, and other data can be examined by disassembling the liquid-crystal display device (e.g., a mobile phone, a monitor, a liquid crystal TV (television), digital signage) and performing chemical analyses such as nuclear magnetic resonance (NMR), Fourier transform infrared spectroscopy (FT-IR), and mass spectrometry (MS).

Embodiment 2

A liquid-crystal display device of Embodiment 2 is similar to the liquid-crystal display device of Embodiment 1 except that a radical polymerizable monomer having a cyclic structure and a monofunctional polymerizable group is used in addition to the radical polymerizable monomers used in Embodiment 1.

Figure 4:
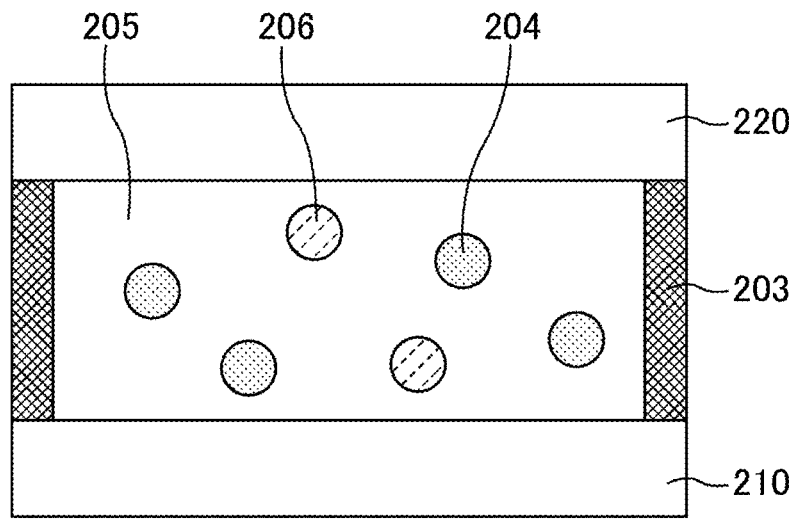
FIG. 4 is a schematic cross-sectional view showing a liquid-crystal display device of Embodiment 2 before the PSA polymerization.
Figure 5:
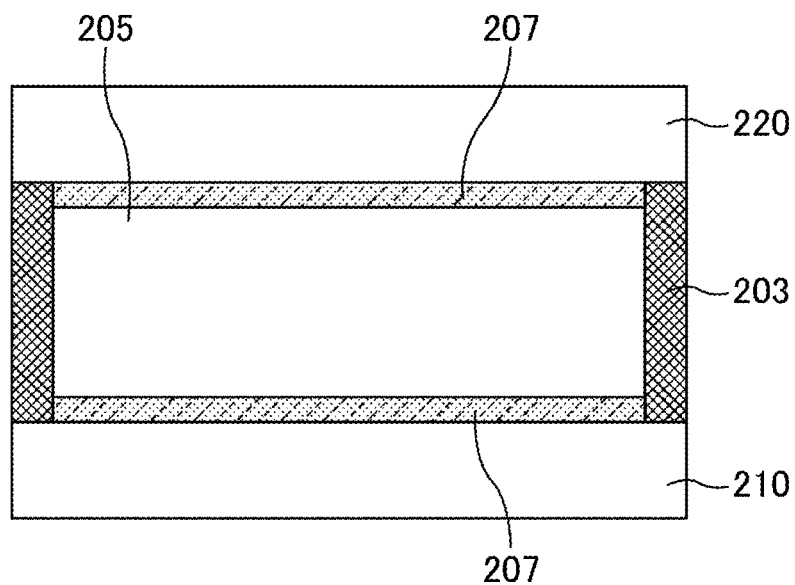
FIG. 5 is a schematic cross-sectional view showing the liquid-crystal display device of Embodiment 2 after the PSA polymerization.

FIG. 4 and FIG. 5 each show a schematic cross-sectional view of the liquid-crystal display device of Embodiment 2. FIG. 4 is before the PSA polymerization and FIG. 5 is after the PSA polymerization. As shown in FIG. 4 and FIG. 5, the liquid-crystal display device of Embodiment 2 comprises a pair of substrates consisting of an array substrate 210 and a color filter substrate 220, and a liquid crystal layer 205 sandwiched between the array substrate 210 and the color filter substrate 220. The array substrate 210 comprises an insulating transparent substrate made of glass or other material, and conductive lines, pixel electrodes, TFTs, and the like disposed on the transparent substrate. The color filter substrate 220 comprises an insulating transparent substrate made of glass or other material, and a color filter, a black matrix, a common electrode, and the like disposed on the transparent substrate.

As shown in FIG. 4, the liquid crystal layer 205 contains a liquid crystal material, a first radical polymerizable monomer 204, and a second radical polymerizable monomer 206 before the PSA polymerization. The liquid crystal material preferably has negative dielectric constant anisotropy. The first radical polymerizable monomer 204 is the compound of the formula (1) and the second radical polymerizable monomer 206 is a compound having a cyclic structure and a monofunctional polymerizable group.

The proportion of the first radical polymerizable monomer 204 in the whole liquid crystal composition constituting the liquid crystal layer before the polymerization is preferably not lower than 0.5% by weight and not higher than 2.5% by weight, and more preferably not lower than 1.0% by weight and not higher than 2.0% by weight. The ratio of the second radical polymerizable monomer 206 to the first radical polymerizable monomer 204 is preferably 10 mol % or more before the polymerization.

Preferably, annealing (heat treatment) is performed after the liquid crystal composition containing a liquid crystal material and the radical polymerizable monomers 204 and 206 are sandwiched between the array substrate 210 and the color filter substrate 220. The annealing allows the radical polymerizable monomers 204 and 206 to diffuse inside the liquid crystal layer 205, making the monomer concentration uniform in the liquid crystal layer 205. This enables uniform formation of the polymer layer 207 to be mentioned later on each of the substrates 210 and 220.

Thereafter, the liquid crystal layer 205 is irradiated with light while heated, so that the radical polymerizable monomers 204 and 206 generate radicals. These radicals serve as active species, and thus the radical polymerizable groups of the radical polymerizable monomers 204 and 206 start and successively promote the chain polymerization. As shown in FIG. 5, the polymer formed by the polymerization precipitates on the substrates 210 and 220 to form polymer layers (PSA layers) 207. The heating temperature is preferably a temperature not lower than the temperature 30° C. lower than the phase transition temperature of the liquid crystal material.

As shown in FIG. 5, the polymer layer (PSA layer) 207 is formed on a surface of each of the array substrate 210 and the color filter substrate 220, each of which has no alignment film, in Embodiment 2. A sealing material 203 is directly attached to the substrates 210 and 220 between the array substrate 210 and the color filter substrate 220 along the peripheries of the substrates 210 and 220. This sealing material 203 seals the liquid crystal layer 205 in between the array substrate 210 and the color filter substrate 220. The application of light to the liquid crystal layer 205 is performed after the liquid crystal layer 205 is sealed by the sealing material 203. Thus, the polymer layers 207 are formed within the area surrounded by the sealing material 203.

In Embodiment 2, a second radical polymerizable monomer 206 having a cyclic structure and a monofunctional polymerizable group is used in addition to the first radical polymerizable monomer 204 of the following formula (1). Examples of the radical polymerizable monomer having a cyclic structure and a monofunctional polymerizable group include a compound represented by the following formula (2):

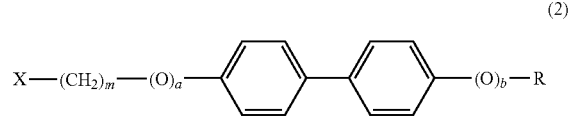

wherein
X represents acrylate, methacrylate, acryloyloxy, methacryloyloxy, vinyl, or allyl;
m is an integer of 0 to 12;
a is 0 or 1;
b is 0 or 1;
R is a C1-C20 alkyl;
each hydrogen atom may optionally be replaced by halogen, methyl, ethyl, or propyl.

In Embodiment 2, the combination use of the compound of the formula (1) and the compound having a cyclic structure and a monofunctional polymerizable group enables formation of a polymer layer providing better alignment of the liquid crystal molecules.

Example 1

The following gives Example 1 in which a liquid crystal cell of the liquid-crystal display device of Embodiment 1 was actually produced. First, a pair of substrates each having a transparent electrode on the surface was prepared. The substrates were washed and, without forming an alignment film, a sealing material was applied to one substrate and beads serving as spacers were scattered on the opposed substrate. Then, the substrates were laminated with each other.

Then, a liquid crystal composition containing a liquid crystal material with negative dielectric constant anisotropy and the compound of the formula (3) (3-hexadecyl-4,4'-dimethylacryloxybiphenyl) as a radical polymerizable monomer was injected into between the substrates.

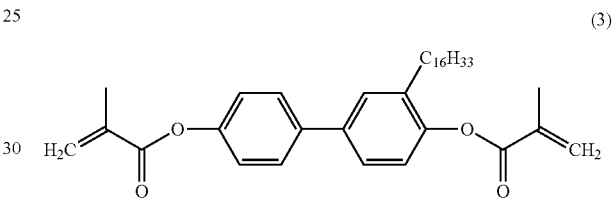

The liquid crystal composition as a sample A contains 2.0% by weight of the compound of the formula (3) in the whole liquid crystal composition. When the compound of the formula (3) is used alone, it precipitates at a concentration higher than 2.0% by weight in the whole liquid crystal composition. Thus, the sample was prepared at a concentration of not higher than 2.0% by weight. After the liquid crystal composition was injected, the liquid crystal cell was heated, in other words, subjected to the annealing.

Then, unpolarized ultraviolet light (2.57 mW/cm$^2$) was applied to the substrates in the normal direction for 30 minutes with no voltage application. Simultaneously, the radical polymerizable monomer was polymerized while the liquid crystal cell was heated at about 90° C. on a hot plate. The source of the unpolarized ultraviolet light was Black Light FHF-32BLB (Toshiba Lighting & Technology Corp.). The electrodes were slit-less flat transparent electrodes (ITO). The sample A was produced as mentioned above.

Figure 6:
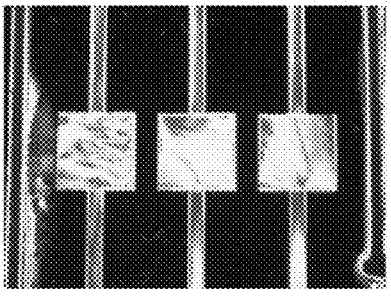
FIG. 6 shows photographs of liquid crystal cells of Example 1 before and after the UV irradiation.
Figure 6:
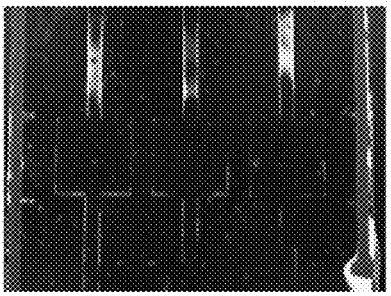

The following will show the alignment of liquid crystal molecules and the result of measuring the voltage holding ratio (VHR) of the sample A. FIG. 6 shows photographs of the liquid crystal cells of Example 1 before and after the UV irradiation through polarizing plates in a crossed-Nicols state.

The alignment of the liquid crystal molecules was evaluated by observing the photographs of the liquid crystal cell before and after the UV irradiation through polarizing plates in a crossed-Nicols state. When the liquid crystal molecules are vertically aligned without alignment defects, the liquid crystal cell shows a substantially completely black screen.

The voltage holding ratio (VHR) was measured using a LC material characteristics measurement system (Model 6254, TOYO Corp.). The liquid crystal cell was put into a 70° C. oven and a pulsed voltage (1 V) was applied between the electrodes for 60 μs. Then, the electric potential between the electrodes was measured during 16.67 ms of the release period (the period with no voltage application). In order to observe a change in the VHR in response to the driving of the liquid-crystal display device, an aging test was performed by irradiating the device with light from an LED backlight for 1000 hours.

With respect to the alignment of the liquid crystal molecules, the liquid crystal cell as the sample A after the UV irradiation showed a substantially completely black screen, as shown in FIG. 6. This proves that the liquid crystal molecules were vertically aligned without alignment defects.

The following Table 1 shows the alignment of the liquid crystal molecules and the result of measuring the initial voltage holding ratio (VHR).

TABLE 1

|  | Sample A |
|---|---|
| Alignment | Good |
| Initial VHR (%) | 99.1 |

The results of Table 1 show that the sample A had a VHR of 99.1% after the UV irradiation. Even after the aging test, the sample A maintained a VHR as high as 99% or higher. This proves that the resulting liquid-crystal display device was excellent in light resistance and had high long-term reliability. The compound of the formula (3) has two polymerizable groups. Thus, even if one of the polymerizable groups generates radicals and ionized by ultraviolet irradiation before the formation of a polymer layer, the other polymerizable group can contribute to the polymerization. As a result, presumably, the compound does not remain in the liquid crystal layer and the reduction in VHR is suppressed.

The aforementioned results show that the use of a radical polymerizable monomer having a biphenyl structure, an alkyl chain, and two polymerizable groups, as represented by the formula (3), can provide a liquid-crystal display device that is capable of maintaining a high voltage holding ratio.

Example 2

The following gives Example 2 in which a liquid crystal cell of the liquid-crystal display device of Embodiment 2 was actually produced.

The liquid crystal composition of Example 2 contained a liquid crystal material having negative dielectric constant anisotropy and the compound of the formula (3) used in Example 1, as well as a compound of the following formula (4) (4-acryloxy-4'-octylbiphenyl). The liquid crystal cell was produced in the same manner as in Example 1 except for the structure of the liquid crystal composition.

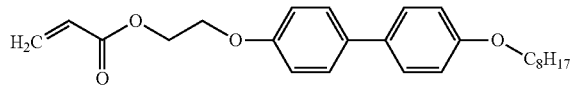

(4)

Samples B to D were produced from the liquid crystal compositions having different concentrations of the compound of the formula (3) and the compound of the formula (4). The monomer concentrations in the whole liquid crystal composition of each sample were shown in Table 2. With respect to the solubilities of the monomers in liquid crystal, no precipitation was observed in the samples B to D.

TABLE 2

|  | Sample B | Sample C | Sample D |
|---|---|---|---|
| Concentration of formula (3) (wt %) | 1.6 | 1.3 | 1.0 |
| Concentration of formula (4) (wt %) | 0.3 | 0.5 | 0.7 |
| Formula (4)/Formula (3) (mol %) | 20.5 | 34.6 | 49.1 |

Figure 8:
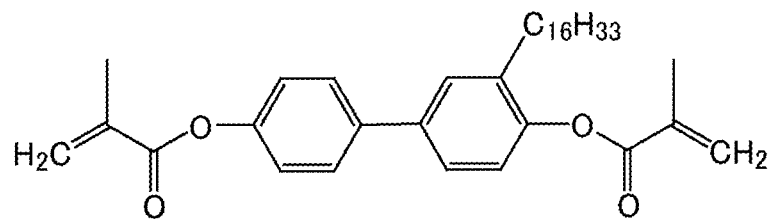
FIG. 8 shows the structures of radical polymerizable monomers.
Figure 8:
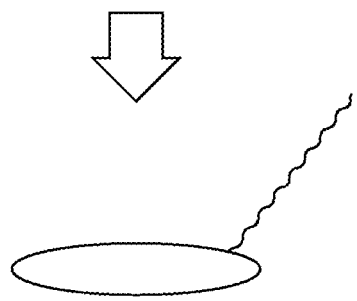
Figure 8:
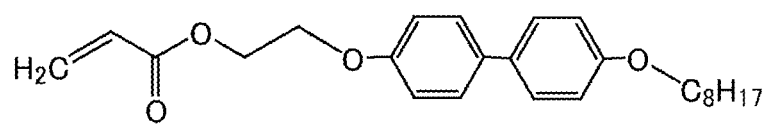
Figure 8:
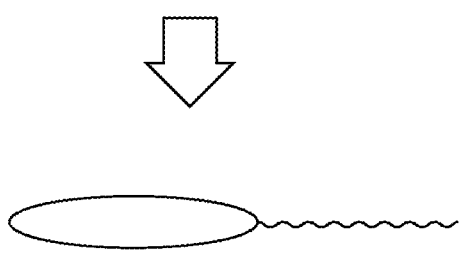

The following will show the alignment of liquid crystal molecules and the result of measuring the voltage holding ratio (VHR) of each of the samples B to D. FIG. 7 shows photographs of the liquid crystal cells of Example 2 before and after the UV irradiation through polarizing plates in a crossed-Nicols state. FIG. 8 shows the structures of the radical polymerizable monomers.

With respect to the alignment of the liquid crystal molecules, the liquid crystal cells of the samples B to D each showed a substantially completely black screen as shown in FIG. 7. This proves that the liquid crystal molecules were vertically aligned without alignment defects. The results of Examples 1 and 2 show that the compound of the formula (3) in combination with the compound of the formula (4) can form a polymer layer for controlling the alignment of the liquid crystal molecules at lower concentrations.

The results of Example 2 will be examined below with reference to FIG. 8. The compound of the formula (3) (3-hexadecyl-4,4'-dimethylacryloxybiphenyl) alone can provide vertical alignment. However, the monomer has a lower linearity because the biphenyl basic structure crosses the alkyl chain. In contrast, the compound of the formula (4) (4-acryloxy-4'-octylbiphenyl) has a higher linearity because the biphenyl basic structure is in the same line with the alkyl chain, as shown in FIG. 8. Thus, the combination use of the compound of the formula (3) and the compound of the formula (4) enables formation of a polymer layer for controlling the alignment of the liquid crystal molecules.

The following Table 3 shows the alignment of the liquid crystal molecules and the results of measuring the initial voltage holding ratio (VHR). The VHR measurement and the aging test were performed under the same conditions as in Example 1.

TABLE 3

|  | Sample B | Sample C | Sample D |
|---|---|---|---|
| Formula (4)/Formula (3) (mol %) | 20.5 | 34.6 | 49.1 |
| Alignment | Good | Good | Good |
| Initial VHR (%) | 97.9 | 97.1 | 95.6 |

Based on the results shown in Table 3, the initial VHR was high when the ratio of the compound of the formula (4) was 10 mol % or more to the compound of the formula (3). The lower the ratio of the compound of the formula (4) to the compound of the formula (3) was, the better the initial VHR was. The VHR after the aging test of each of the samples B to D showed a tendency similar to that in the case of the initial VHR, and the VHR did not decrease. As a result, the resulting liquid-crystal display device was excellent in light resistance and had high long-term reliability.

The aforementioned results show that the combination use of a radical polymerizable monomer having a biphenyl structure, an alkyl chain, and two polymerizable groups, as represented by the formula (3), and a radical polymerizable monomer having a cyclic structure and a monofunctional polymerizable group, as represented by the formula (4), can also provide a liquid-crystal display device which is capable of maintaining a high voltage holding ratio.

Example 3

The following gives Example 3 in which a liquid crystal cell of the liquid-crystal display device of Embodiment 2 was actually produced.

The liquid crystal compositions of Example 3 contained a liquid crystal material having negative dielectric constant anisotropy and the compound of the formula (3) used in Example 1, as well as a compound of the following formula (5). They were defined as samples E to G. The compounds each represented by the formula (5) in the samples E to G had different values for m in the formula, in other words, different lengths of the alkyl chain (spacer) between the polymerizable group and the basic structure. The liquid crystal cell was produced in the same manner as in Example 1 except for the structure of the liquid crystal composition.

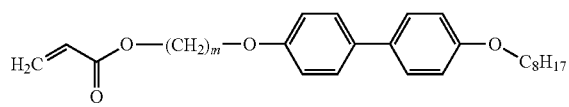
(5)

In the formula, m is an integer of 0 to 12.

The liquid crystal compositions as the samples E to G each contained 1.6% by weight of the compound of the formula (3) in the whole liquid crystal composition and 0.3% by weight of the compound represented by one of the following formulas (6) to (8) in the whole liquid crystal composition. Each of the compounds of the formulas (6) to (8) is a compound represented by the formula (5) in which m is 2, 4, or 8.

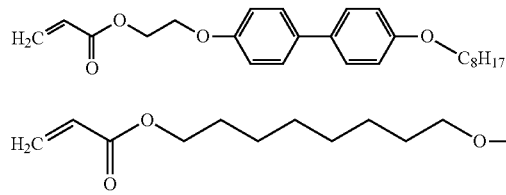
(6)

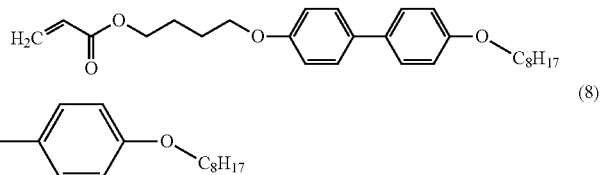
(7)

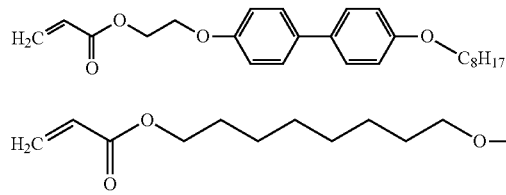
(8)

In Example 3, the alignment and the VHR of the compound of the formula (5) were evaluated with different lengths of the spacer (different values for m). Table 4 shows the alignment of the liquid crystal molecules and the results of measuring the initial voltage holding ratio (VHR). The measurement of the VHR and the aging test were performed under the same conditions as in Example 1.

TABLE 4

| | Sample E | Sample F | Sample G |
|---|---|---|---|
| Length of spacer of formula (5) (number in m) | 2 | 4 | 8 |
| Alignment | Good | Good | Good |
| Initial VHR (%) | 97.5 | 98.0 | 98.1 |

The results of Table 4 show that the liquid crystal molecules were vertically aligned to the substrate surfaces after the UV irradiation regardless of the length of the spacer (the value for m) in the compound of the formula (5). The initial VHR was as high as about 98% in each of the samples E to G. The greater the value for m was, the better the results were. The VHR after the aging test was 98% or higher in each of the samples E to G. As a result, the liquid-crystal display device was excellent in light resistance and had high long-term reliability.

The aforementioned results show that the combination use of a radical polymerizable monomer having a biphenyl structure, an alkyl chain, and two polymerizable groups, as represented by the formula (3), and a radical polymerizable monomer having a cyclic structure and a monofunctional polymerizable group, as represented by any of the formulas (6) to (8), can provide a liquid-crystal display device which is more effectively capable of maintaining a high voltage holding ratio.

REFERENCE SIGNS LIST 110, 210: array substrate (provided with a transparent electrode)
120, 220: color filter substrate (provided with a transparent electrode)
103, 203: sealing material
104, 204: first radical polymerizable monomer
105, 205: liquid crystal layer
107, 207: polymer layer (PSA layer)
206: second radical polymerizable monomer

The invention claimed is:

1. A liquid-crystal display device comprising
a pair of substrates;
a liquid crystal layer which is sandwiched between the substrates and which contains a liquid crystal material; and
a polymer layer which is disposed on a surface of each of the substrates and which controls the alignment of liquid crystal molecules,
the outermost surfaces of both the substrates comprising substantially no alignment film,
the polymer layer being obtained or obtainable by polymerizing two or more radical polymerizable monomer species added to the liquid crystal layer, and
at least one species of the one or more radical polymerizable monomer species being a compound represented by the following formula (1):

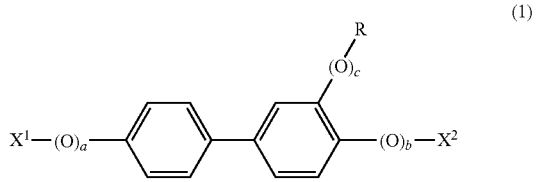

wherein
$X^1$ and $X^2$ may be the same as or different from each other, and represent acryloyl, methacryloyl, vinyl, or allyl;
a is 0 or 1;
b is 0 or 1;
c is 0 or 1;
R is a C1-C20 alkyl; and
each hydrogen atom may optionally be replaced by halogen, methyl, ethyl, or propyl; and
at least another one species of the one or more radical polymerizable monomer species has a cyclic structure and a single monofunctional polymerizable group.

2. The liquid-crystal display device according to claim 1, wherein R in the compound of the formula (1) is a C4-C20 alkyl.

3. The liquid-crystal display device according to claim 1, wherein R in the compound of the formula (1) is a C8-C20 alkyl.

4. The liquid-crystal display device according to claim 1, wherein R in the compound of the formula (1) is a C16-C20 alkyl.

5. The liquid-crystal display device according to one of claims 1-2,
wherein the radical polymerizable monomer having the cyclic structure and the single monofunctional polymerizable group is a compound represented by the following formula (2):

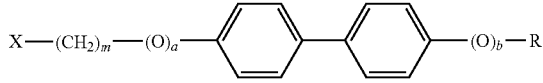

wherein
X represents acrylate, methacrylate, acryloyloxy, methacryloyloxy, vinyl, or allyl;
m is an integer of 0 to 12;
a is 0 or 1;
b is 0 or 1;
R is a C1-C20 alkyl; and
each hydrogen atom may optionally be replaced by halogen, methyl, ethyl, or propyl.

6. The liquid-crystal display device according to claim 5, wherein R in the compound of the formula (2) is a C4-C12 alkyl.

7. The liquid-crystal display device according to claim 5, wherein R in the compound of the formula (2) is a C8-C12 alkyl.

8. The liquid-crystal display device according to claim 5, wherein m in the compound of the formula (2) is an integer of 2 or greater.

9. The liquid-crystal display device according to claim 5, wherein m in the compound of the formula (2) is an integer of 4 or greater.

10. The liquid-crystal display device according to claim 5, wherein m in the compound of the formula (2) is an integer of 8 or greater.

11. The liquid-crystal display device according to claim 2 or 1,
wherein the proportion of the compound of the formula (1) is not lower than 0.5% by weight and not higher than 2.5% by weight in the whole liquid crystal composition constituting the liquid crystal layer before the polymerization.

12. The liquid-crystal display device according to claim 2 or 1,
wherein the ratio of the radical polymerizable monomer having a cyclic structure and a monofunctional polymerizable group is 10 mol % or more to the compound of the formula (1) before the polymerization.

13. The liquid-crystal display device according to claim 2 or 1,
wherein the liquid crystal material has negative dielectric constant anisotropy.

14. A process for producing a liquid-crystal display device, comprising the steps of:
injecting a liquid crystal composition that contains a liquid crystal material and one or more radical polymerizable monomer species into between a pair of substrates the outermost surfaces of which comprise substantially no alignment film;
applying light to the liquid crystal composition to polymerize the radical polymerizable monomers to thereby form a polymer layer which controls the alignment of liquid crystal molecules on a surface of each of the substrates; and
a heating step at a temperature not lower than a temperature 30° C. lower than a phase transition temperature of the liquid crystal material,
at least one species of the one or more radical polymerizable monomer species being a compound represented by the following formula (1):

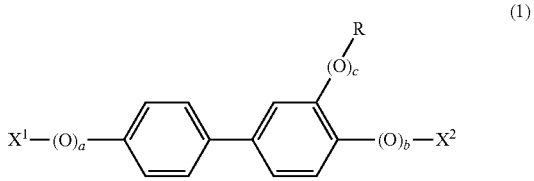

wherein
$X^1$ and $X^2$ may be the same as or different from each other, and represent acryloyl, methacryloyl, vinyl, or allyl;
a is 0 or 1;
b is 0 or 1;
c is 0 or 1;
R is a C1-C20 alkyl; and
each hydrogen atom may optionally be replaced by halogen, methyl, ethyl, or propyl.

15. A process for producing a liquid-crystal display device, comprising the steps of:
injecting a liquid crystal composition that contains a liquid crystal material and one or more radical polymerizable monomer species into between a pair of substrates the outermost surfaces of which comprise substantially no alignment film;
annealing;
after the annealing step, applying light to the liquid crystal composition to polymerize the radical polymerizable monomers to thereby form a polymer layer which controls the alignment of liquid crystal molecules on a surface of each of the substrates, at least one species of the one or more radical polymerizable monomer species being a compound represented by the following formula (1):

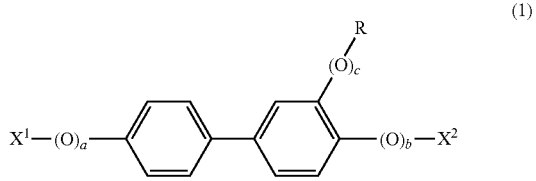

wherein
$X^1$ and $X^2$ may be the same as or different from each other, and represent acryloyl, methacryloyl, vinyl, or allyl;
a is 0 or 1;
b is 0 or 1;
c is 0 or 1;
R is a C1-C20 alkyl; and
each hydrogen atom may optionally be replaced by halogen, methyl, ethyl, or propyl.

16. The liquid-crystal display device according to claim 1, wherein c in formula (1) is 0.

17. The liquid-crystal display device according to claim 1, wherein c in formula (1) is 1.

18. The liquid-crystal display device according to claim 8, wherein c in formula (1) is 0.

19. The liquid-crystal display device according to claim 8, wherein c in formula (1) is 1.

20. The liquid-crystal display device according to claim 11, wherein c in formula (1) is 0.

21. The liquid-crystal display device according to claim 11, wherein c in formula (1) is 1.

22. The liquid-crystal display device according to claim 12, wherein c in formula (1) is 0.

23. The liquid-crystal display device according to claim 12, wherein c in formula (1) is 1.

* * * * *